Jan. 5, 1926.  
E. C. BURNS  
BRAKE SYSTEM  
Filed Sept. 24, 1924
1,568,497
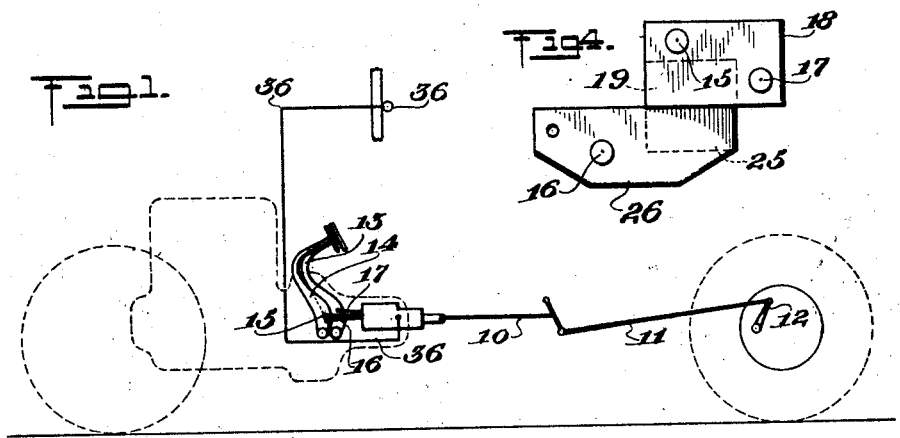
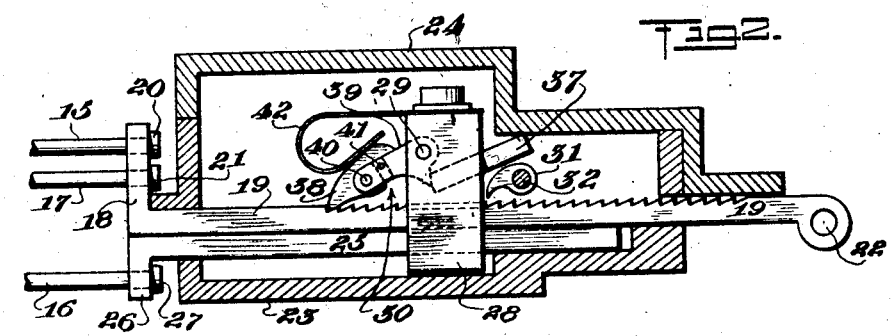
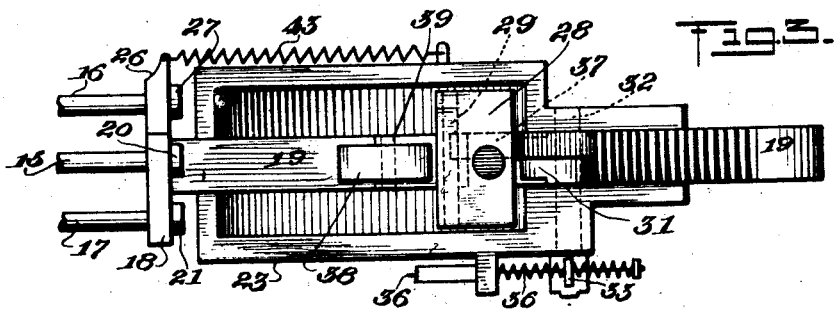
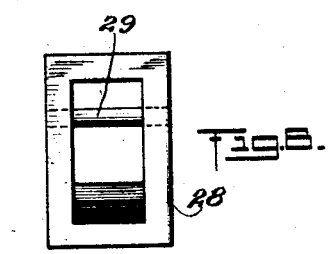
INVENTOR  
*Edward C. Burns*  
BY  
*Mason, Fenwick & Lawrence*  
ATTORNEYS Patented Jan. 5, 1926.

1,568,497

UNITED STATES PATENT OFFICE.

EDWARD C. BURNS, OF WINONA, MINNESOTA, ASSIGNOR TO JOHN E. BURNS, OF WINONA, MINNESOTA.

BRAKE SYSTEM.

Application filed September 24, 1924. Serial No. 739,674.

*To all whom it may concern:*

Be it known that I, EDWARD C. BURNS, citizen of the United States, residing at Winona, in the county of Winona and State of Minnesota, have invented certain new and useful Improvements in Brake Systems; and I do hereby declare the following to be a full, clear, and exact description of the invention, such as will enable others skilled in the art to which it appertains to make and use the same.

My invention has for its object to increase the power of foot, hand or other man-power brakes, and is particularly adapted to automobile brakes. It consists primarily in means, preferably operated by the clutch, to take up first with a weak leverage and longer motion the slack, play and give in the brake connections, and then with a stronger leverage but shorter motion powerfully complete the application of the brake.

In order that my invention may be fully understood, I shall first describe in detail the mode in which I at present prefer to carry the invention into practice and then particularly point out the novel features of the invention in the claims.

Reference is to be had to the accompanying drawing forming part of this application in which the same parts are designated by like numbers in all the figures.

Figure 1 is a diagrammatic view indicating the application of my invention to an automobile brake.

Figure 2 is a sectional elevation illustrating the principal features of a brake intensifying mechanism embodying my invention.

Figure 3 is a plan view of the mechanism shown in Figure 2, the cover of the enclosing case being removed.

Figure 4 is an end view showing the relative arrangement of the actuating rods of said mechanism.

Figure 5 is a side elevation of part of the brake locking and releasing device of the same.

Figure 6 is an end view of a detail hereafter referred to.

In the drawings 10 and 11 (Figure 1) are the ordinary pull rods by which the automobile brake is applied and 12 the usual lever arm connected thereto for setting the brake; 13 is the ordinary clutch pedal lever, and 14 the usual brake pedal lever.

To the brake lever 14, at the ordinary point of connection, I prefer to connect a brake operating rod 15 to operate the brake with the usual power in the usual way. To the brake lever 14 at a point nearer the fulcrum and thus to give much greater leverage and power, though with less motion or travel, I connect a brake operating rod 16. To the clutch lever 13, at a point preferably further from its fulcrum than the rod 15 is from the brake lever fulcrum, I connect a brake operating rod 17.

The rods 15 and 17 pass loosely through an arm 18 of a brake operating ratchet bar 19 and have heads or stops 20 and 21 on their respective ends so that when either rod 15 or 17 is pulled the ratchet bar 19 will be pulled likewise, without affecting the rod not pulled.

The ratchet bar 19 is connected, as by an eye 22, to the brake rod 10 so that when it is pulled it will set the brake.

The ratchet bar 19 is mounted to slide lengthwise in a fixed case 23 having a removable cover 24. In the case 23 is also mounted to slide lengthwise beneath and on the ratchet bar 19, and independently thereof, a bar 25, having an arm 26 to which is connected a retracting spring 43 and the rod 16, the rod 16 passing loosely through the arm 26, and having a head or stop 27 beyond the same, so that the bar 25 will be pulled with the rod 16, but said rod can be retracted without moving the bar 25.

To the bar 25 is fixed a box 28, through which the ratchet bar 19 slides and which can itself move lengthwise in the case 23. In and to the box 28 is pivoted on the pivot 29, a spring pressed jointed pawl 30, to engage the ratchet teeth of the bar 19. With this construction when the clutch lever 13 is pressed forward to unclutch in the usual way, the ratchet bar will be drawn beneath the pawl 30, until the play or slack in the brake and its connections is taken up, and then the pawl 30 will through the box 28 lock the bar 19 and thus the shortened brake connections to the under bar 25. By then pressing forward the brake lever 14, it will, with the increased leverage, the shorter travel being all that is now necessary, much more powerfully apply the brake, through the rod 16.

For locking the brake when thus set, I prefer to employ a dog 31 fixed on a rockshaft 32 mounted transversely in the case 23, and adapted to engage the teeth of the ratchet bar 19. The rock-shaft 32 has an arm 33, which is pressed on both sides by springs 34 and 35 respectively, which are controlled by a Bowden wire 36 leading from the switchboard, so that the dog 31 can be lowered to engage and lock the ratchet bar and brake 25 or raised to free the same. Automatically to trip the jointed pawl 30, and free the ratchet bar 19 from the bar 25, when the brake and clutch levers are released, I prefer to fix a stop 37 in the case 23, in position to strike a shoulder on the pawl 30 when the engaged bars 19 and 25 are retracted by the brake springs, and thus raise the pawl 30 from the teeth of the ratchet bar 19. Better to insure this action, I make the pawl 30 in two parts 38 and 39, connected by a pivot 40, and limited by a stop 41, meeting a shoulder on the part 38, the pawl spring 42, being fixed to the box 28 and so arranged with respect to the parts, that when the bars 19 and 25 are projected as described, the spring will bear on the pawl part 38 forward of the pivot 40 and thus press the whole pawl against the teeth, but when the pawl is tripped and raised by the stop 37, the pawl spring 42, will bear on the pawl part 38 rearward of the pivot 40, and thus assist in raising the toe of the pawl part 38 from the teeth.

It is evident that a brake intensifying device of this character may be used in other mechanical situations than automobiles, as for example where a brake is to be applied after shutting off power, the power shut-off being preferably employed as here illustrated first to take up the slack, play or give in the brake and its connections, and the brake mechanism being employed with lessened travel but increased power to complete and intensify the application of the brake.

I claim as my invention:

1. The combination, with a brake and two relatively adjustable brake operating bars, of a ratchet and pawl connection between the two operating bars, whereby the two brake operating bars may be adjusted and locked with respect to each other.

2. The combination, with a brake, two relatively adjustable brake operating bars, and independently operating levers connected with the respective brake operating bars, of a ratchet and pawl connection between the two bars, whereby the brake operating bars can be first adjusted and locked with respect to each other by one operating lever, and then operated by the other operating lever.

3. The combination, with a brake, two relatively adjustable armed brake operating bars, and a ratchet and pawl connection between the two bars, of two operating levers, and rods connected with the respective levers, passing loosely through the arms of the respective bars, and having heads outside said arms.

4. The combination with a brake, two relatively adjustable brake operating bars, ratchet teeth on one bar, a pawl on the other bar and operating levers connected with the respective brake operating bars, of a fixed bearing, a dog pivoted thereto to engage the ratchet teeth, and means for engaging the dog with and disengaging it from the ratchet teeth.

5. The combination of a brake, a brake operating ratchet bar, a dog to engage the ratchet teeth, a rock shaft carrying the dog, an arm on the rock shaft, opposing springs acting on said arm and a wire connected with said arm.

6. The combination, of a brake, two relatively adjustable brake operating bars, a ratchet and pawl connection between the brake operating bars, and a tripper to meet the pawl and disengage it from the ratchet when the brake operating bars are retracted.

7. The combination of a brake, two relatively adjustable brake operating bars, ratchet teeth on one bar, a jointed pawl on the other bar, a spring pressing on one pawl member, and a tripper to meet the other pawl member when the bars are retracted, the arrangement being such that the spring will hold the pawl joint straight when the bars are projected, but will tend to bend the pawl joint when the tripper meets the pawl member.

In testimony whereof I affix my signature.

EDWARD C. BURNS.